J. MOHR.
EXTENSION TABLE.
APPLICATION FILED MAY 23, 1910.

1,056,763.

Patented Mar. 18, 1913.

2 SHEETS—SHEET 1.

Witnesses
Florence M. Mallon
Henry F. Schmidt

Julius Mohr, Inventor
By
Attorney

J. MOHR.
EXTENSION TABLE.
APPLICATION FILED MAY 23, 1910.
1,056,763. Patented Mar. 18, 1913.
2 SHEETS—SHEET 2.
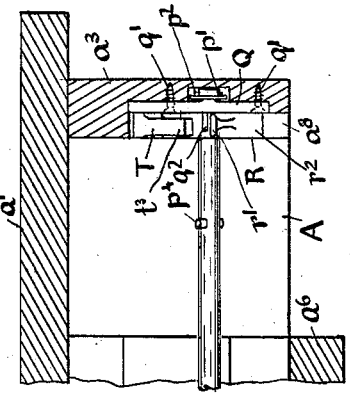
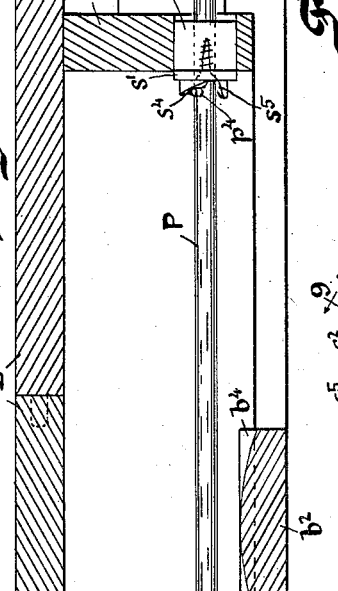

UNITED STATES PATENT OFFICE.

JULIUS MOHR, OF MILWAUKEE, WISCONSIN.

EXTENSION-TABLE.

1,056,763. Specification of Letters Patent. Patented Mar. 18, 1913.

Original application filed May 20, 1909, Serial No. 497,261. Divided and this application filed May 23, 1910. Serial No. 562,872.

*To all whom it may concern:*

Be it known that I, JULIUS MOHR, a subject of the Emperor of Austria-Hungary, residing at Milwaukee, Wisconsin, have invented an Extension-Table, of which the following is a specification.

This invention relates to tables of the folding or extension type, wherein a table is made longer or shorter according to the wishes of the user as the demand for same may arise, the table being made up of two main members which may be pushed together closely or separated to a greater or less extent, and the space between them when so extended being taken up by one or more removable leaves.

The object of my present invention is to provide a locking device which will automatically lock the table together with any desired number of leaves in place therein, but can be released at once by a movement of the hand when it is desired to change the number of leaves.

My locking-device in its preferred form acts purely by gravity and without the use of springs, whereby it can be manufactured more cheaply and with less need for repairs. However, I may provide an attachment herein disclosed whereby the device will not unlock of its own accord even when the table is tilted or turned upside down.

In its original form, since improved, my locking-device was described and claimed in connection with my copending United States patent application No. 497,261 filed May 20, 1909, in connection with my improved extension-table, but it is to be understood that the invention is applicable to any extension-table when provided with suitable mountings.

Figure 1:
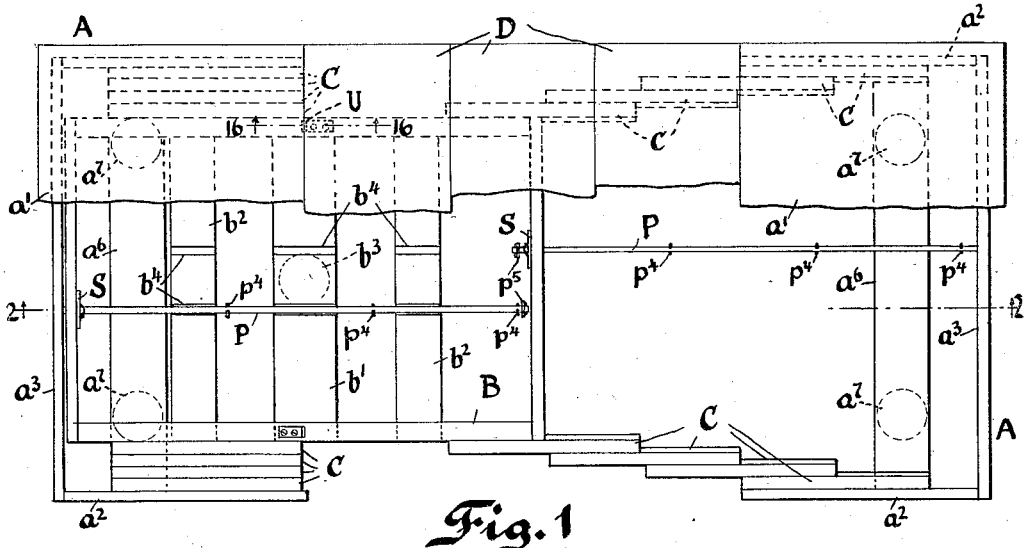
Figure 2:
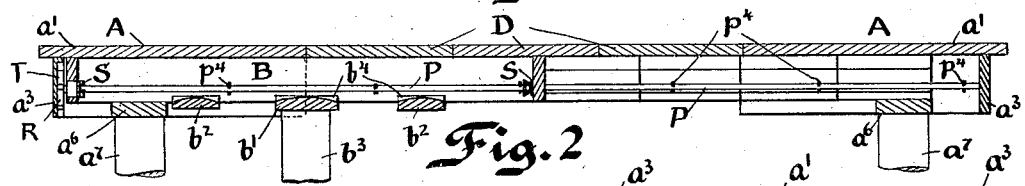
Figures 3, 4:
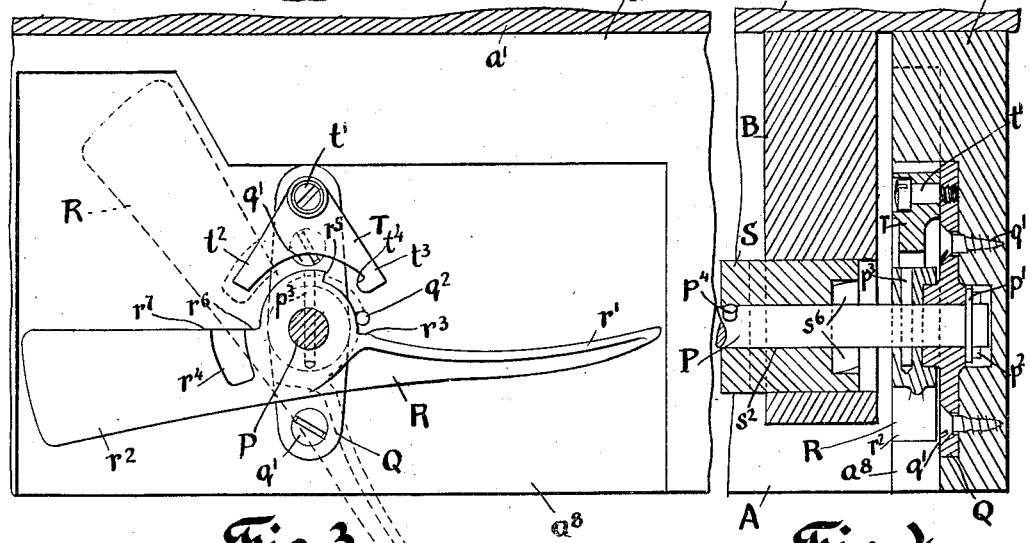

The nature of my invention will best be understood from a consideration of the following detailed description thereof, taken in connection with the accompanying drawings, wherein;

Figure 1 is a plan-view of a table with the top-boards partly broken away, provided with my locking-device; the left-hand half of the table being shown collapsed and the right-hand half fully extended; Fig. 2 is a longitudinal section through the same taken on the plane 2, the legs being partly broken away; Fig. 3 is a front elevation on an enlarged scale, from the inner side, of the parts mounted on the end-board of each end of the table, the lock-rod being shown in cross-section; Fig. 4 is a longitudinal section through the same on the axis of the lock-rod, the latter being shown in elevation; Fig. 5 is a longitudinal section through the upper portion of the table on the axis of the lock-rod, the latter with mountings being shown in elevation; Fig. 6 is a front-view of the locking-block or fixed element of the locking-device, the lock-rod being shown sectionally *in situ*; Fig. 7 is a plan-view of the locking-block; Figs. 8 and 9 are longitudinal sections therethrough on the planes 8 and 9 respectively of Fig. 6. Fig. 10 is a perspective view of the same; Fig. 11 is a front-view of an alternative mounting for the end of the lock-rod and manipulating handle therefor; Fig. 12 is a side-elevation thereof, the table end-board being shown in section; Fig. 13 is a longitudinal section of another alternative form of mounting and manipulating handle with the end of the lock-rod, the latter and handle being shown in elevation; Fig. 14 is a front view thereof from the outer side of the end-board; Fig. 15 may represent either the end-view of the mounting shown in Figs. 11 and 12 or a transverse section on the plane 15 of the mounting shown in Figs. 13 and 14; and Fig. 16 is a fragmental cross-section of one of the table leaves and central frame on the plane 16 of Fig. 1, the leaf being shown in central position.

In these drawings every reference numeral and letter refers to the same part in each figure.

The table as here shown for purposes of illustration comprises end-members A which are connected together in slidable relation with the rectangular center-frame B by means of a plurality of extension slides C. Extension-leaves D varying in number with the desired length of the table, may be inserted by drawing out one or both end-members from the central frame. Each of the end-members may comprise a top-board $a'$, side-boards $a^2$ to which are secured two of the slides C, an end-board $a^3$ and a cross-plank $a^6$, to which are secured a pair of legs $a^7$; and similarly the center-frame B may be provided with one or more cross-planks $b'$, $b^2$, upon the middle one of which is mounted the center-leg $b^3$. If the center-leg were to be omitted, it would suffice for the purpose of my invention to omit one set of slides and secure the frame B permanently to one of the end-members A; in which case Fig. 1 may, with the above-named omissions represent the table as pulled completely out instead of only on one side.

My invention comprises, as here shown, a lock-rod P, one end of which is pivoted in a bearing-box Q mounted upon the end-board $a^3$ of the table. On this end the lock-rod carries an operating-handle or arm; and said handle or arm may be mounted either on the inside of the end-board, as in Figs. 3 and 11, or upon the outside, as in Fig. 13. I will first describe the inside-mounting of Figs. 3 and 4, in which a recess $a^8$ is mortised out from the inner side of the end-board in order to enable the lock-rod mountings to set flush with the inner face of the end-board, whereby greater compactness and therefore a greater extension ratio of the table is secured; this however, is a minor mater. The bearing-box Q is, as shown, set flush in this recess, having screws $q'$ by which it is secured to the end-board. The lock-rod P projects through the bore thereof and is secured against pulling out by suitable means such as a washer $p'$ and pin $p^2$; and on the opposite side of the bearing-box is a manipulating handle R, said handle being provided with a handle-end $r'$ on one side of the pivot and a counter-weight $r^2$ on the other side, the latter being of sufficient weight to over-balance the handle-end and turn the lock-rod up tight, as will be presently described. Said handle R is secured to the lock-rod by a key or pin $p^3$. The other end of the rod passes through the locking-block S, which is set in a hole in the end-board of the frame B (see Figs. 4 and 5). Said locking-block has screw-ears $s'$ or other means of attachment to the end-board of the frame B, and a cylindrical bore $s^2$ fitting the rod P and forming a journal-bearing therefor, and on opposite sides of this bore is a pair of grooves or recesses $s^3$ adapted to pass any one of a number of pins $p^4$ which are set diametrically upon the rod P in position corresponding to the several extensions of the table. The angle at which these pins are set upon the rod is such that they will register with the grooves $s^3$ when the lock-rod P has been turned by the operating handle R into the position shown in dotted lines in Fig. 3, in which the weighted end $r^2$ is raised; so that in normal position, said pins will not register with the grooves $s^3$. To prevent the rod from being pulled completely out a washer $p^5$ may be mounted on the free end thereof, backed by a cross-pin $p^6$, and if the lock-rod is so thin in proportion to its length that it tends to sag or droop, it may be supported by cross-planks $b^2$ placed at intervals of the frame B and having rounded or beveled grooves $b^4$ cut therein to hold the rod so that the pins $p^4$ and washer $p^5$ cannot catch upon their edges.

On the inner face of the locking-block S, on one or both sides of the recesses $s^3$, are formed oblique cam-faces $s^4$ and $s^5$ (see Figs. 5, 7, 8 and 10), which are engaged by any of the pins $p^4$ after it has passed through the recesses $s^3$ from the outside and is then rotated; so that by properly placing of such pin $p^4$ the rotation of the rod through a certain angle tends to draw the table up tightly into position, and thereby compensate any slight irregularity in the width of the leaves or the setting of the pins on the rod. It will be observed that as shown in Figs. 8 and 9, the recesses $s^3$ are narrowed to the size of the protruding ends of the pin $p^4$ at the cam-face of the block S, but that inside the bore the sides of the grooves diverge obliquely, forming helicoidal cam-faces $s^6$.

Now the action of the locking-rod in locking the table at any given extension, as thus far described, is as follows: Supposing the table be in closed position and it be desired to insert a leaf, or one more leaf than is in it, the handle R is first pulled down into the position shown in dotted lines in Fig. 3. This brings the pins $p^4$ on the rod into register with the grooves $s^3$ in the locking-block, so that the table can be pulled out to any desired extent, whereupon the handle is released and falls back into the full line position or somewhat farther until it is brought to a stop by a stop-pin $q^2$ engaging with a shoulder $r^3$, or other suitable device. The leaf or leaves are now inserted in the table, and the latter pushed together again. In pushing the table together, each pin $p^4$ as it reaches the block S will first strike the helicoidal cam-surfaces $s^6$ thereof and be thereby turned into registering position so that it will easily pass through the block. If such pin is the one corresponding to the extension with the given number of leaves, then when the table is pushed up tight, the pin is in position to engage the cam-surfaces $s^4$, and the weighted end $r^2$ of the handle will now rotate the rod P, until the table is drawn up tight and will so hold it, as the cam-surfaces are of insufficient obliquity to allow it to be rotated backward by pulling out on the table.

As thus far described the device is operative while the table is upright, but should the table be tilted or turned upside down, as in carrying from one room to another or in shipping, the lock-rod would become unlocked by the rotation of the handle R by gravity. To prevent this I provide a locking-pawl T, which is pivotally mounted upon a screw or pin $t'$ mounted on the face of the bearing-block Q and has two legs $t^2$ and $t^3$ straddling the hub of the handle R. The leg $t^2$ is cut away at the back and its projecting end, when the pawl hangs centrally as shown in the drawing, is in position to enter a recess $r^4$ on the corresponding side of the counterweight $r^2$; while the other leg $t^3$ has a shoulder $t^4$ which is adapted to engage a coacting shoulder $r^5$ on the hub of the handle. The shoulder $t^4$, however, clears the shoulder $r^5$ when the pawl hangs centrally, and only engages it when it is tilted toward it.

So long as the table stands upright, the pawl T hangs centrally, and does not interfere with the movement of the handle R, but should the table be tilted or reversed, the pawl T will fall toward one side or the other, and in doing so either the leg $t^2$ will engage the upper face of the counterweight $r^2$ at $r^6$, or on the other side the shoulder $t^3$ will engage the shoulder $r^5$, and in either case the operating handle is prevented from turning into the unlocking position. It will be clear also that the engaging shoulders $r^5$ and $t^4$ may be omitted, as in this case the leg $t^2$ will lock the handle R by engaging with the counterweight $r^2$ on the opposite side of the recess $r^4$ at $r^7$. The same principle may be embodied in a great number of similar mechanical devices, and I do not therefore consider my invention limited to this specific form.

Instead of the counterweighted pull-down handle of Figs. 3 and 4, I may use a push-up handle R' as shown in Figs. 11 and 12, which is also shown as mounted on the inside of the end-board $a^3$ in a recess $a^9$ upon a journal-block Q'. The inner side of this journal-block may be provided with a shouldered notch $q^2$, and a transverse pin $p^7$ on the end of the lock-rod engages the rear face of the journal-block within the notch $q^2$ (see Fig. 15), the end of which limits the falling movement of the handle R'.

Figs. 13 and 14 show a somewhat different style of manipulating device, the lock-rod P here passing through the end-board $a^3$ and being journaled in the block $Q^2$, which is set in a hole therein. On its protruding end the rod carries a handle $R^2$, which has a swinging movement through an equal angle on each side of the vertical, being secured to the rod by a screw $r^8$. The block $Q^2$ on its inner face is also notched out at $q^3$ to receive a pin $p^8$, holding the rod against endwise movement and also limiting its angular movement. In this case the locking rotation of the rod can take place in either direction, the unlocking position being the central position of the rod shown in dotted lines at $R^3$, Fig. 14.

It will be observed that in Figs. 5 to 10 I have shown upon the cam-lugs on one side of the notches $s^3$ oblique faces $s^5$ which are much steeper than the cam-faces $s^4$. As a matter of fact, where the handle locks in only one direction, the faces on one side only of the grooves $s^3$ will come into action in the locking, and the others only by pulling out the table in case of any irregularity in the angular setting of the pins, to guide them into the grooves $s^3$; therefore they are made steeper in order that the greater angle of rotation may be utilized for locking without unduly increasing the inclination of the cam-surfaces $s^4$. In a case like Figs. 13 and 14, where the lock-rod locks equally on either side of the recesses $s^3$, the faces $s^4$ and $s^5$ are given the same inclination.

While I have hereinabove described the preferred form of my invention, I wish it understood that I do not limit myself to any one of the particular features thereof, and I fully realize that it is capable of numerous modifications, and I consider such modifications and omissions may be made without departing from the principle of my invention.

Where two lock-rods are used, as in the drawings, to enable these to act independently an abutment-pin, or lug U is placed in the center of each side of the frame B, against which the leaf D on each side of the center rests, and the leaves may be recessed as at $d'$, $d^2$ to receive it. The recess $d'$ is used only where it is desired to extend the table symmetrically with an odd number of leaves.

Having thus described my invention, what I claim as new and desire to secure by Letters Patent is:

1. In an extension-table, in combination with an end-piece and a member having a sliding relation therewith, a locking-rod mounted on one of said members with its axis in the direction of the sliding-movement and having a projection at one point thereof corresponding to a position of extension at which the two members are to be locked, there being a hole in the other member through which said rod passes and a recess at one side of said hole through which said projection is adapted to pass when said rod is at a certain angle; the edges of said recess being widened out on the outer end of said hole so as to strike said projection laterally and move it into the position in which it can pass through said recess as the members are pushed together, and said projection being adapted to engage over the edge of said hole as it reaches the inner side and is turned out of engagement with said recess to prevent the members from being pulled out, and means for normally holding said rod in the angular position of engagement.

2. In an extension-table, in combination with an end-piece and a member having a sliding relation therewith, a locking-rod mounted on one of said members with its axis in the direction of the sliding-movement and having a projection at one point thereof corresponding to a position of extension at which the two members are to be locked, there being a hole on the other member through which said rod passes and a recess at the side of said hole through which said projection is adapted to pass when said rod is at a certain angle; the edges of said recess being widened out on the outer end of said hole so as to strike said projection laterally and move it into the position in which it can pass through said recess as the members are pushed together, and said projection being adapted to engage over the edge of said hole as it reaches the inner side and is turned out of engagement with said recess to prevent the members from being pulled out, and a weighted operating-handle adapted to be moved to rotate said rod into the releasing position and the weight of which is positioned to rotate said rod into and hold it in the engaging position when said handle is released.

3. In an extension-table, in combination with an end-piece and a member having a sliding relation therewith, of a locking-rod mounted on one of said members with its axis in the direction of the sliding-movement and having a projection at one point thereof corresponding to a position of extension at which the two members are to be locked, there being a hole in the other member through which said rod passes and a recess at the side of said hole through which said projection is adapted to pass when said rod is at a certain angle, and a gravitating-device to engage the locking-device when the table is tilted and prevent it from becoming unlocked.

4. In an extension-table, the combination of two members having an extensible relation one with the other and a locking-element mounted on one of said members and connected with the other and maintaining itself normally in locked position; said locking-element having means for limiting the extension of the two members; and a gravity-operated device engaging said locking element when the table is tilted and thereby preventing it from becoming unlocked.

5. In an extension-table, the combination of two members having, an extensible relation one with the other and a locking-element mounted on one of said members and connected with the other and maintaining itself normally in locked position; said locking-element having means for limiting the extension of the two members, but permitting their being moved together; and a gravity-operated device engaging said locking-element when the table is tilted and thereby preventing it from becoming unlocked.

6. In an extension-table, in combination with a locking-device adapted to lock the table in an extension corresponding to any desired number of leaves, actuating means for said locking-device, and a gravity-operated attachment coöperating with and acting to lock said locking-device when the table is tilted and leave it free when the table is upright.

7. In an extension-table, the combination with a rotatable locking-device normally holding the table locked, of a gravity-operated pawl adapted to engage said locking-device when the table is tilted and thereby prevent it from becoming unlocked.

8. In an extension-table, in combination with a gravity-operated locking-device normally holding the table locked in position in an extension corresponding to the desired number of leaves, gravity-operated means acting when the table is tilted to lock said locking-device and thereby prevent the table from becoming unlocked.

9. In an extension-table, in combination with a rotatable lock-rod, means coacting with said lock-rod to lock the table in one angular position of said lock-rod and to release it in another angular position thereof, gravity-operated means for holding said lock-rod normally in the locked position, and means actuated by the tilting of the table for positively holding said rod in said position when tilted.

10. In an extension-table, in combination with a rotatable lock-rod, means coacting with said lock-rod to lock the table in one angular position of said lock-rod and to release it in another angular position thereof, gravity-operated means for holding said lock-rod normally in the locked position, and means actuated automatically by the tilting of the table to lock said rod against rotation into the unlocked position.

11. In an extension-table, in combination with a rotatable lock-rod, means coacting with said lock-rod to lock the table in one angular position of said lock-rod and to release it in another angular position thereof, gravity-operated means for holding said lock-rod normally in the locked position, and a gravity-operated pawl coacting with one or more shoulders carried by said lock-rod to prevent the same from rotating into unlocking position when the table is tilted by leaving it free to be so rotated when the table is upright.

12. In an extension-table, the combination of an end-piece and a member having a sliding relation therewith, of a locking device comprising a pivotally mounted rod, a guide therefor, an actuating handle on said rod having a shoulder and a recess on opposite sides of the rod, and a gravitating pawl mounted independently of said rod and adapted for coöperation with said shoulder and recess.

13. In an extension table, the combination of an end-piece and a member having a sliding relation therewith, of a pivotally mounted rod; a guide therefor, an actuating handle on said rod having a shoulder and a recess on opposite sides of the rod, and a gravitating pawl mounted independently of said rod and adapted for coöperation with said shoulder and recess, said operating handle having an additional shoulder, and a fixed pin disposed between said shoulders.

In witness whereof I have hereunto set my hand in presence of two witnesses.

JULIUS MOHR.

Witnesses:
 CHARLES MOSES,
 O. A. BORTH.